Jan. 13, 1925.　　　　　　　　　　　　　　　　1,522,600
D. J. STRICKLAND
APPARATUS FOR HANDLING AND DRYING BRICKS OR OTHER PLASTIC PRODUCTS
Filed Nov. 22, 1921　　5 Sheets-Sheet 1

Inventor
D.J. STRICKLAND.
By Hull, Brock & Wesh
Attys.

Jan. 13, 1925.
1,522,600
D. J. STRICKLAND
APPARATUS FOR HANDLING AND DRYING BRICKS OR OTHER PLASTIC PRODUCTS
Filed Nov. 22, 1921
5 Sheets-Sheet 4
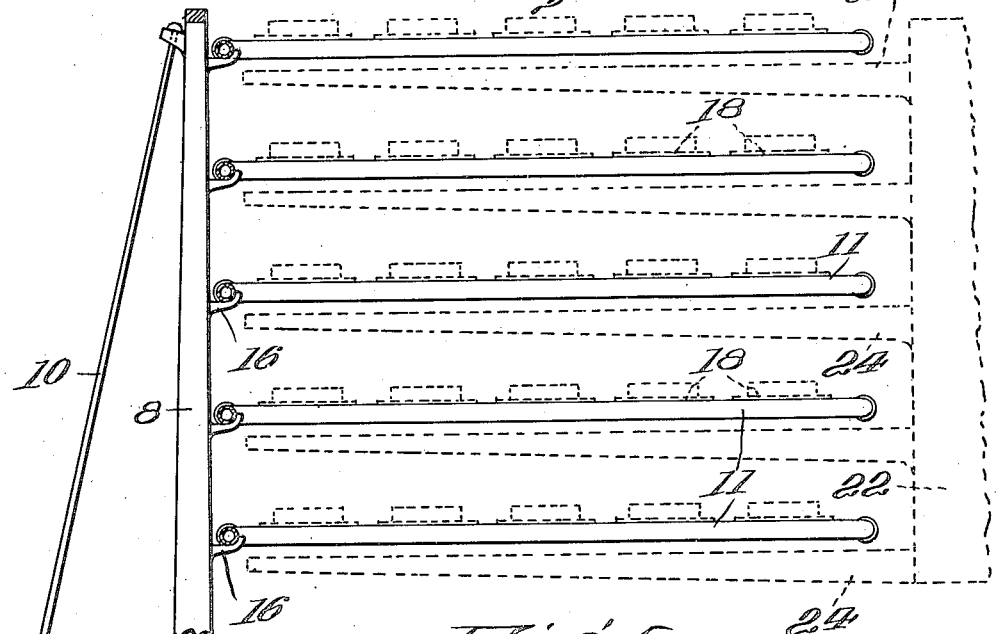
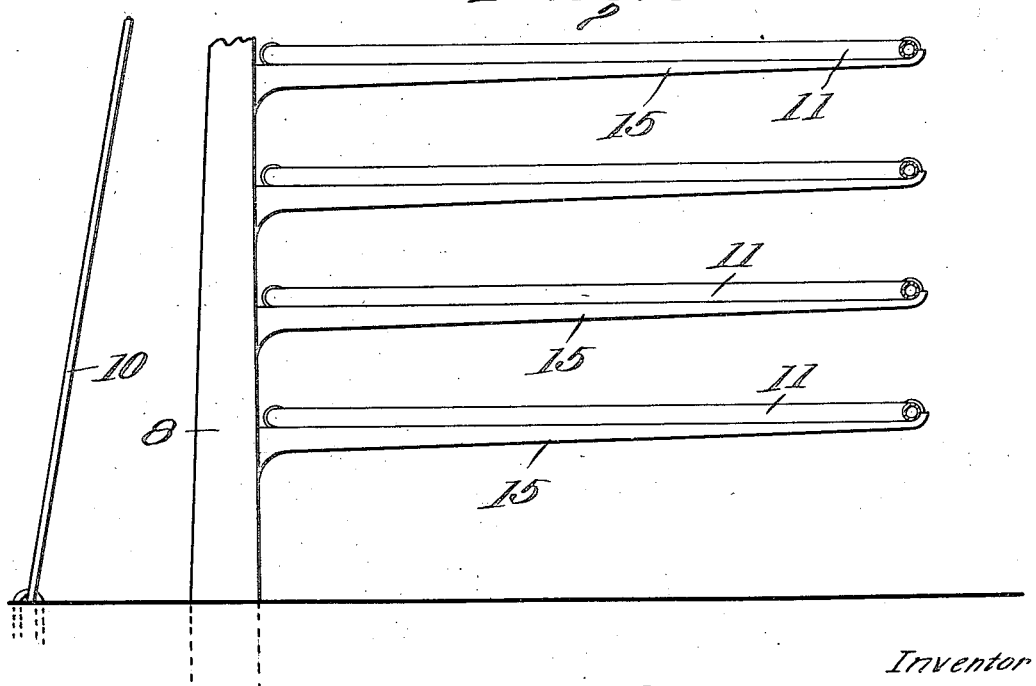
Inventor
D. J. STRICKLAND.
By Hull, Brock & West
Attys.

Jan. 13, 1925.
1,522,600
D. J. STRICKLAND
APPARATUS FOR HANDLING AND DRYING BRICKS OR OTHER PLASTIC PRODUCTS
Filed Nov. 22, 1921
5 Sheets-Sheet 5
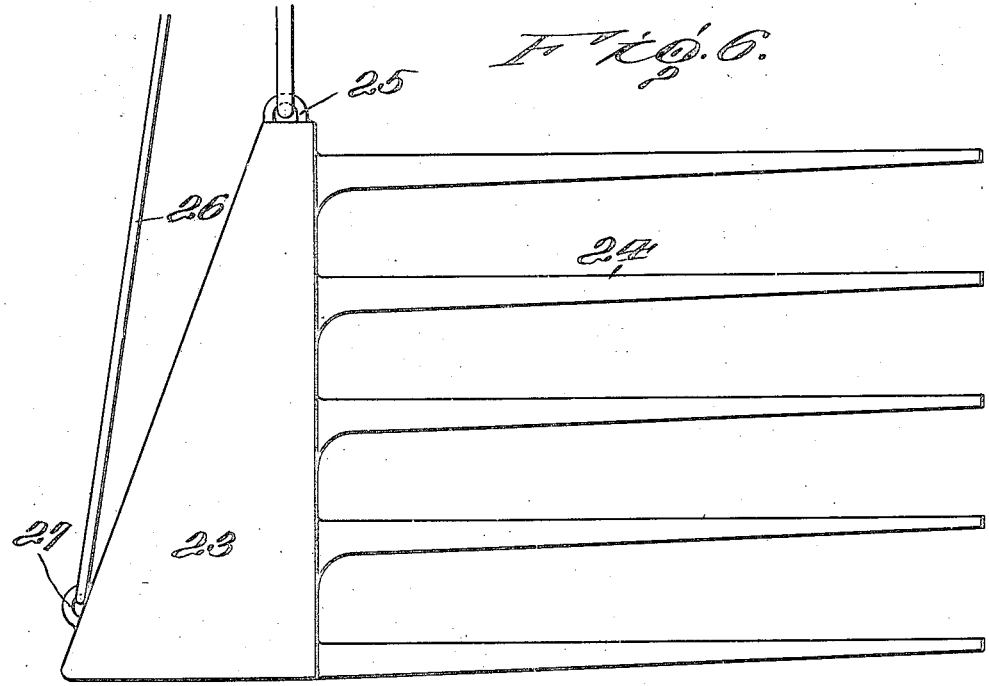
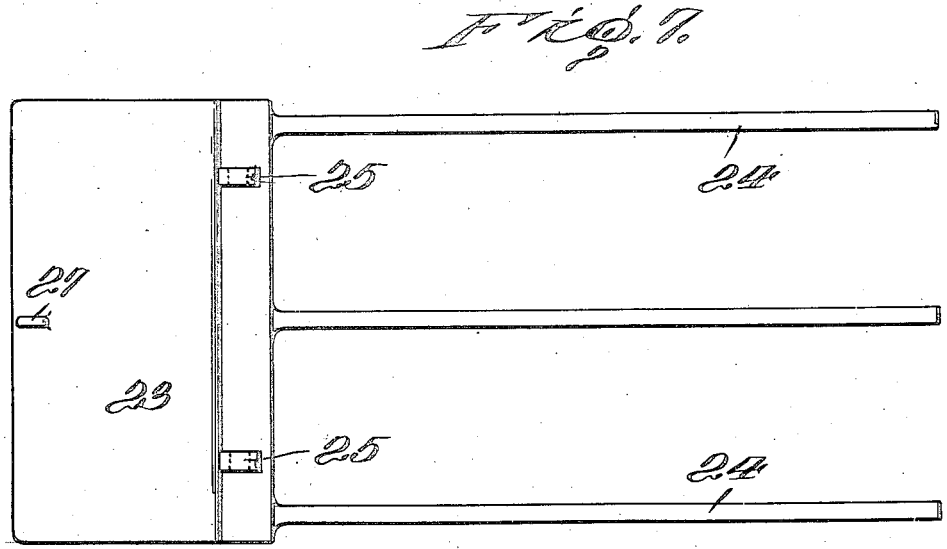
Inventor
D. J. STRICKLAND.
By Hull, Brock + West
Attys.

Patented Jan. 13, 1925.

1,522,600

UNITED STATES PATENT OFFICE.

DAVID J. STRICKLAND, OF CLEVELAND, OHIO, ASSIGNOR TO THE AMERICAN EQUIPMENT COMPANY, OF CHICAGO, ILLINOIS.

APPARATUS FOR HANDLING AND DRYING BRICKS OR OTHER PLASTIC PRODUCTS.

Application filed November 22, 1921. Serial No. 517,005.

*To all whom it may concern:*

Be it known that I, DAVID J. STRICKLAND, a citizen of the United States, residing at Cleveland, in the county of Cuyahoga and State of Ohio, have invented a certain new and useful Improvement in Apparatus for Handling and Drying Bricks or Other Plastic Products, of which the following is a full, clear, and exact description, reference being had to the accompanying drawings.

This invention relates to a method of and apparatus for handling and drying bricks or other plastic products, the object being to provide a system whereby the bricks may be taken away from the brick machine, stored in a drying plant and removed from the drying plant when dried to the kiln in such a manner that the handling of the bricks is greatly facilitated and I am able to handle the same capacity of bricks and dry the same in about one-half the space required in driers now in use.

Another object of my invention is to provide novel means for conveying the bricks to the drier and for removing the bricks from the conveying means and placing the same on shelves in such a manner that all danger of injuring the bricks in any way is prevented, the bricks being supported on shelves so that they will dry quickly.

Other and further objects and advantages of the invention will be hereinafter set forth and the novel features thereof defined by the appended claims.

In the drawings,

Figure 4 is a section on line 4—4 of Figure 3;

Figure 5 is a section on line 5—5 of Figure 3;

Figure 6 is a side elevation of a receiving device;

Figure 7 is a top plan view of the receiving device; and

Figure 1:
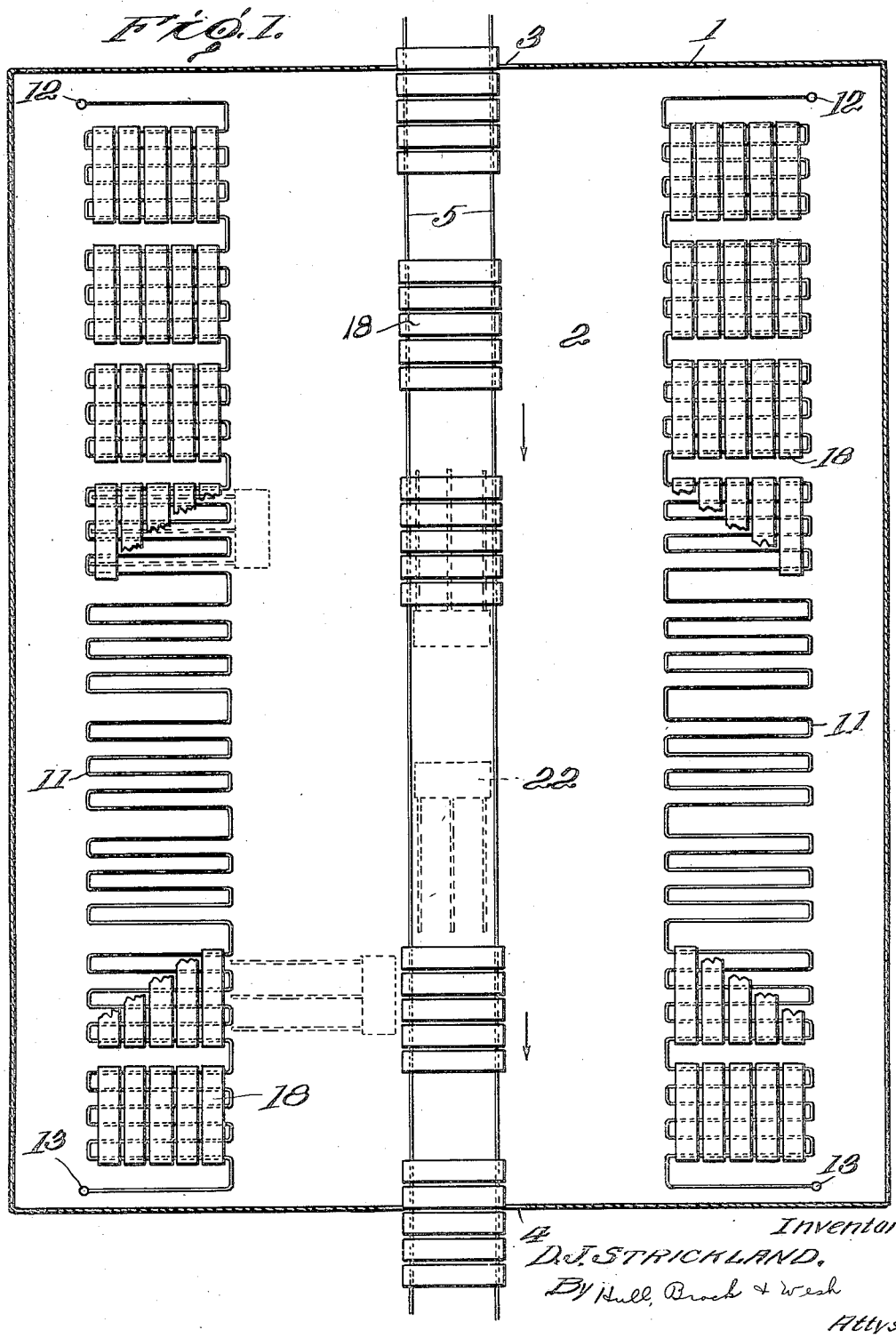
Figure 1 is a horizontal section through a building constituting a drier showing the apparatus diagrammatically.
Figure 2:
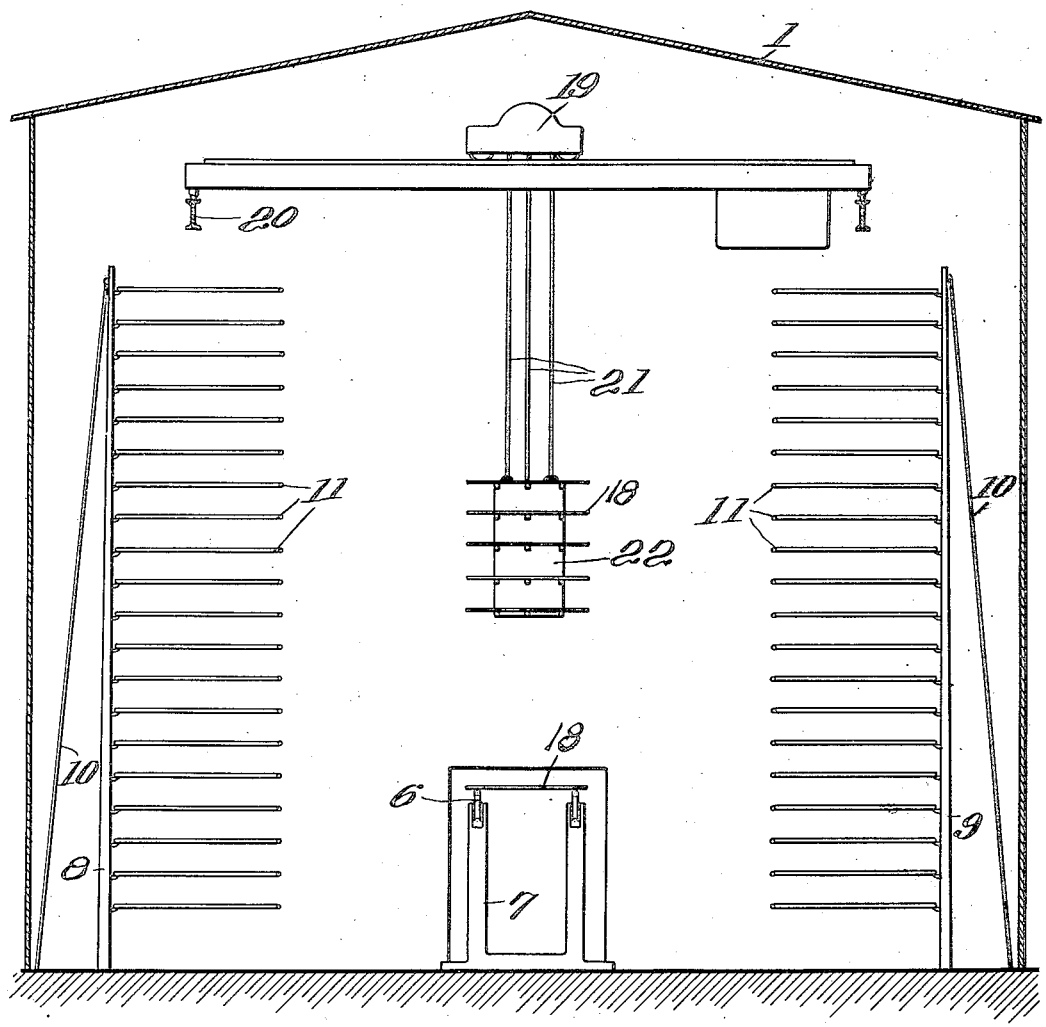
Figure 2 is a vertical section showing the apparatus diagrammatically.

In the embodiment of my invention as shown, 1 indicates a building forming a drying chamber 2, which may be formed in the usual manner and is provided with an opening 3 at one end through which the pallet of bricks are adapted to enter the building and an outlet 4 at the other end through which the pallets pass in being removed to the drier.

The openings 3 and 4 are preferably arranged at the longitudinal center of the chamber and passing through these openings is an endless conveyor composed of a pair of flexible cables 5 traveling on sheaves 6 mounted in supports 7, said conveyor extending from the brick machine to the kiln so that the bricks can be taken away from the brick machine as they are made, supported in the drier and after being dried can be placed back on the conveyor and conveyed to the kiln.

Arranged within the chamber at each side of the openings 3 and 4 and spaced from the side walls are frames 8 and 9 braced by tie rods 10, said frames carrying a vertically disposed series of shelves 11 formed of piping connected at one end to a feed header 12 and at the other end to an exhaust header 13.

Figure 3:
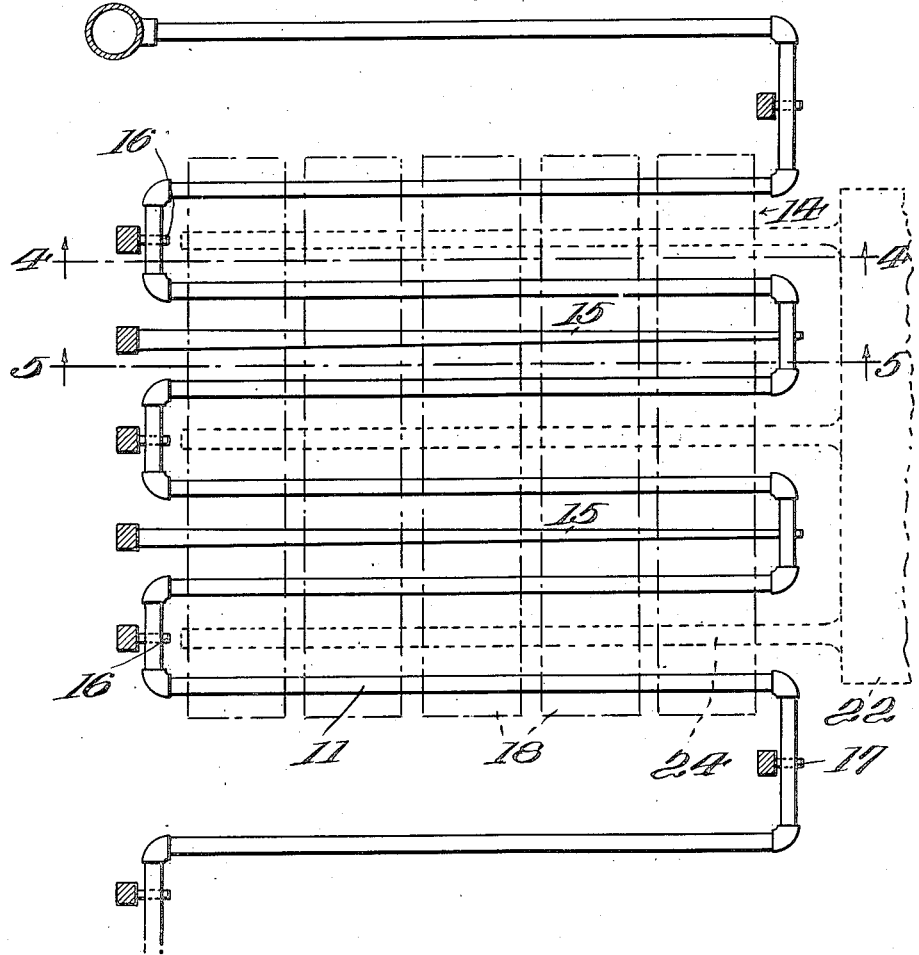
Figure 3 is a plan view of a portion of one of the shelves, the dotted and dash line showing the manner in which the pallets are placed thereon and the dotted lines showing the manner in which the receiving device carried by the traveling crane places the pallets upon the shelves.
Figure 8:
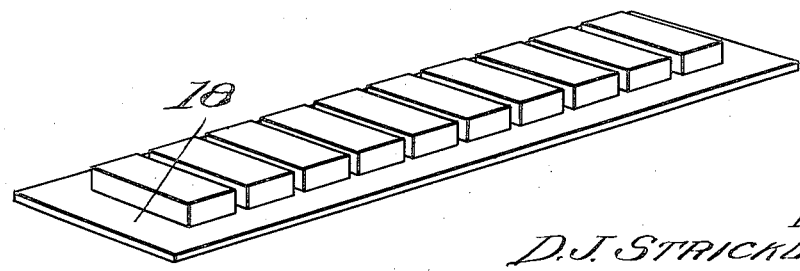
Figure 8 is a perspective view of a pallet with the bricks thereon.

A vacuum system such as now in use may be employed to facilitate the passage of steam through the pipes as the manner of supplying the pipes with steam forms no part of my invention. The pipes are bent to form a series of substantially U-shaped members or return bends and are arranged to form shelves spaced apart as clearly shown and the particular manner of forming these shelves is immaterial so long as each horizontal row of shelves is formed of a series of supporting members spaced apart from the next series, each series being provided at their outer ends with openings 14 as shown in Figure 3 in order to allow the supporting arms of the receiving device to pass vertically through the spaced pipe sections forming the series to remove or insert a set of pallet boards as will be hereinafter fully described.

The pipes constituting the shelves are supported at their outer ends by arms 15 and at their inner ends by fingers 16, the connecting member of each series being supported by fingers 17 in order to form a strong structure which will support the pallets containing the bricks. By having the shelves arranged in series and in superposed position, the pallets containing the bricks are held spaced apart so that the bricks thereon will dry quickly and as the shelves constituting the supports for the pallets are formed of piping through which steam passes, I have found in practice that pallets containing bricks placed on shelves in this manner will dry rapidly.

The pallets 18 are placed on the endless conveyor 5 in sets, each set constituting five pallets and in placing these pallets on the endless conveyor, they are placed slightly apart so that when they are removed and deposited on one of the series of shelves, they will remain spaced in order to allow a circulation of air between each pallet.

While I have shown a construction for handling a set of five pallets with a shelf specially adapted to receive said number, it is, of course, understood that I do not wish to limit myself to the handling of any number of pallets at one time as my invention consists in providing means for removing a plurality of pallets from a conveyor and depositing said pallets on a shelf by a receiving device which will be hereinafter fully described.

In the drawing I have failed to show any means for driving the endless conveyor formed of the flexible cables but it is, of course, understood that the same can be driven by various means, as means will have to be provided for starting and stopping the same or it might be intermittently driven automatically, the speed being so timed that the interval the same remains at rest will be of sufficient length of time to allow the receiving device to remove a set of pallets and place them on the shelves and return to a position to receive the next set as it is brought over the same.

In order to provide means for removing the sets of pallets from the endless conveyor and supporting them on the shelves or removing the sets of pallets and returning them to the conveyor, I provide the building with a traveling crane 19 mounted on rails 20 arranged in the upper portion of the building above the tiers of shelves, said traveling crane being provided with cables 21 supporting a receiving device 22 which comprises a body 23 formed of metal of substantially the shape shown having a plurality of superposed fingers 24 arranged in sets of three so as to form a three-point support for the pallets as they are lifted from the conveyor. The cables 21 of the crane are attached to eyes 25 secured in the top of the body 23 on the line of the center of gravity when the body is completely loaded. To prevent the forward end from tilting upwardly when the device is empty or not completely loaded, a cable 26 is attached to an eye 27 towards the lower end to the rear side of the base 23, the other end being attached to the crane 19 and is adapted to be raised and lowered with the cables 21.

The operation of my improved apparatus for carrying out the method of handling and drying bricks and other plastic products is as follows:—The conveyor which travels longitudinally through the drying chamber in a direction as shown by the arrow brings in a set of pallets 15 and as these cables are arranged above the floor of the chamber and spaced apart, the receiving device has free movement to drop between the cables and after it has been dropped between the cables, it is moved under a set of pallets so that the topmost set of fingers will be under the set of pallets and as the crane is raised, these pallets are lifted off of the conveyor and this is repeated until a set has been deposited on each of the sets of finger receiving devices. The device is then elevated to the level of the topmost series of shelves at the receiving end of the chamber and the crane is then turned so as to bring the fingers thereof in such a position that they can pass through the openings 14 and when the receiving device is lowered, it sets the pallets on five superposed shelves and this operation is repeated until the pallets containing the bricks are stored.

After the bricks have been dried, when it is desired to remove the pallets containing the bricks from the drier and place them back onto the endless conveyor so that they can be conveyed to the kiln, the operation is reversed or in other words, the receiving device is raised and the fingers thereof moved under a plurality of sets of pallets so that when raised these pallets will be lifted off of the shelves.

The receiving device is then lowered and turned and dropped between the cables and then the bottom set of pallets will be deposited on the cables of the endless conveyor and as the conveyor is moved out from under the receiving device, this set of pallets will be removed and this is repeated until all of the sets or five sets carried by the five supporting fingers of the receiving device are deposited on the conveyor.

I have described the operation of the receiving device as moving under the sets of pallets to receive and deliver the pallets therefrom, but it is, of course, understood that when the receiving device has been lowered between the cables, the conveyor can be moved from under the receiving device so as to deposit the sets of pallets thereon and therefore I do not wish to limit myself to the actual mode of loading or unloading the pallets from the conveyor to the receiving device.

What I claim is:—

1. A device of the kind described comprising an endless conveyor comprising spaced members, a series of racks arranged upon opposite sides of said conveyor and arranged in sets and adapted to receive a plurality of pallets, and a receiving device adapted to pass between the members of the conveyor and receive the pallets thereon and deposit said pallets upon the racks.

2. A device of the kind described comprising a plurality of serpentine shaped racks and a lifting device comprising a plurality of laterally extending arms adapted to receive pallets and deposit the same upon the racks, said arms passing between the elements of the serpentine racks.

3. A device of the kind described comprising racks arranged one above the other, each rack being of serpentine formation, the alternate open and closed ends of said rack being in alignment and a lifting device comprising a plurality of spaced laterally projecting arms adapted to receive pallets and deposit them upon the racks, said arms passing between the elements forming the open ends of the serpentine racks.

4. In a device of the kind described the combination with an endless conveyor comprising spaced members, a lifting device adapted to be cast between the members and receive pallets thereon, said lifting device having a plurality of spaced laterally projecting arms and racks arranged upon opposite sides of said endless conveyor, said racks being arranged one above the other and each rack consisting of a plurality of serpentine shaped sections, the alternate opened and closed ends of each section being arranged in alignment.

5. A device of the kind described comprising a chamber having an endless conveyor extending longitudinally therethrough formed of flexible cables elevated from the bottom of said chamber, a series of racks arranged in said chamber at each side of said conveyor, said racks being formed of steam piping and disposed in sets and a traveling crane mounted in said drying chamber having a receiving device provided with a plurality of supporting fingers for receiving the sets of pallets from the conveyor and elevating the same and depositing them on the sets of racks.

6. A device of the kind described comprising a chamber having a plurality of racks arranged adjacent the opposite sides thereof, an endless conveyor passing through said chamber and a travelling crane carrying a lifting device with a plurality of arms for receiving a plurality of pallets and depositing them upon the racks.

7. A device of the kind described comprising a shed having a chamber provided with an opening at each end, an endless conveyor passing through said shed for conveying bricks from the brick machine to said shed and for carrying bricks from said shed to a kiln, said conveyor comprising a pair of cables mounted in a plane above the bottom of said shed, a plurality of racks arranged in said shed at each side of said conveyor, a traveling crane mounted in the top of said shed and a receiving device comprising a metal body having a plurality of arms for receiving the pallets containing the bricks conveyed into said shed, elevating said pallets in sets and depositing said pallets in sets upon said shelves.

In testimony whereof, I hereunto affix my signature.

DAVID J. STRICKLAND.